(12) United States Patent
Bannai et al.

(10) Patent No.: US 8,565,235 B2
(45) Date of Patent: Oct. 22, 2013

(54) SYSTEM AND METHOD FOR PROVIDING TRANSPARENT LAN SERVICES

(75) Inventors: Vinay Bannai, Sunnyvale, CA (US);
Theodora Karali, Mountain View, CA (US); Peter Geoffrey Jones, Campbell, CA (US); Jacqueline M. Zoucha, Sunnyvale, CA (US); Arun Sastry, Palo Alto, CA (US)

(73) Assignee: Adtran, Inc., Huntsville, AL (US)

( * ) Notice: Subject to any disclaimer, the term of this patent is extended or adjusted under 35 U.S.C. 154(b) by 322 days.

(21) Appl. No.: 12/275,080

(22) Filed: Nov. 20, 2008

(65) Prior Publication Data
US 2009/0074413 A1    Mar. 19, 2009

Related U.S. Application Data

(63) Continuation of application No. 10/140,308, filed on May 6, 2002.

(51) Int. Cl.
*H04L 12/56* (2011.01)
(52) U.S. Cl.
USPC .......................................... 370/392; 709/238
(58) Field of Classification Search
None
See application file for complete search history.

(56) References Cited

U.S. PATENT DOCUMENTS

| | | | |
|---|---|---|---|
| 4,663,748 A | 5/1987 | Karbowiak et al. | |
| 4,698,804 A | 10/1987 | Flores et al. | |
| 5,311,585 A | 5/1994 | Armstrong et al. | |
| 5,333,130 A | 7/1994 | Weissmann et al. | |
| 5,398,236 A | 3/1995 | Hemmady et al. | |
| 5,636,205 A | 6/1997 | Suzuki et al. | |
| 5,721,819 A | 2/1998 | Galles et al. | |
| 5,790,523 A | 8/1998 | Ritchie et al. | |
| 5,793,745 A | 8/1998 | Manchester | |
| 5,978,378 A | 11/1999 | Van Seters et al. | |
| 6,011,780 A | 1/2000 | Vaman et al. | |
| 6,047,331 A | 4/2000 | Medard et al. | |
| 6,094,582 A | 7/2000 | Zimmermann | |
| 6,122,759 A | 9/2000 | Ayanoglu et al. | |
| 6,226,296 B1 | 5/2001 | Lindsey et al. | |
| 6,229,788 B1 | 5/2001 | Graves et al. | |
| 6,236,640 B1 | 5/2001 | Klink | |
| 6,269,452 B1 | 7/2001 | Daruwalla et al. | |
| 6,292,464 B1 | 9/2001 | Elahmadi et al. | |
| 6,304,347 B1 | 10/2001 | Beine et al. | |
| 6,305,019 B1 | 10/2001 | Dyer et al. | |
| 6,343,081 B1 | 1/2002 | Blanc et al. | |

(Continued)

FOREIGN PATENT DOCUMENTS

| | | |
|---|---|---|
| EP | 0843360 | 5/1998 |
| EP | 0901169 | 3/1999 |

(Continued)

OTHER PUBLICATIONS

ISSCC 200/Feb. 8, 2000/Salon 1-6—Digest of Technical Papers.

(Continued)

*Primary Examiner* — Chi Pham
*Assistant Examiner* — Mohammad Adhami
(74) *Attorney, Agent, or Firm* — Sawyer Law Group, P.C.

(57) ABSTRACT

A system and method provide transparent LAN services in a metro-WAN environment to extend enterprise LANs over metro and wide area networks. The transparent LAN services generally provide customers with a layer two Ethernet connectivity with MAC learning capabilities.

9 Claims, 6 Drawing Sheets

(56) References Cited

U.S. PATENT DOCUMENTS

| | | | |
|---|---|---|---|
| 6,400,681 B1 | 6/2002 | Bertin et al. | |
| 6,426,947 B1 | 7/2002 | Banker et al. | |
| 6,557,112 B1 | 4/2003 | Shimada | |
| 6,639,896 B1* | 10/2003 | Goode et al. | 370/224 |
| 6,647,428 B1 | 11/2003 | Bannai et al. | |
| 6,788,681 B1 | 9/2004 | Hurren et al. | |
| 6,931,002 B1 | 8/2005 | Simpkins et al. | |
| 6,965,592 B2* | 11/2005 | Tinsley et al. | 370/352 |
| 6,973,026 B1 | 12/2005 | Dyrga et al. | |
| 7,065,089 B2 | 6/2006 | Kuhl et al. | |
| 7,068,654 B1* | 6/2006 | Joseph et al. | 370/392 |
| 7,079,544 B2 | 7/2006 | Wakayama et al. | |
| 7,154,861 B1 | 12/2006 | Merchant et al. | |
| 7,254,138 B2* | 8/2007 | Sandstrom | 370/412 |
| 7,269,185 B2 | 9/2007 | Kirkby et al. | |
| 7,327,757 B2 | 2/2008 | Ghahremani et al. | |
| 7,668,166 B1* | 2/2010 | Rekhter et al. | 370/392 |
| 2002/0027906 A1 | 3/2002 | Athreya et al. | |
| 2002/0085553 A1 | 7/2002 | Ku et al. | |
| 2002/0114031 A1* | 8/2002 | Yamada | 359/119 |
| 2002/0176371 A1* | 11/2002 | Behzadi | 370/254 |
| 2002/0176373 A1 | 11/2002 | Sato | |
| 2002/0176450 A1 | 11/2002 | Kong et al. | |
| 2003/0009599 A1* | 1/2003 | Lee et al. | 709/251 |
| 2003/0026209 A1 | 2/2003 | Katz | |
| 2003/0110268 A1 | 6/2003 | Kermarec et al. | |
| 2003/0118019 A1 | 6/2003 | Mark et al. | |
| 2003/0120763 A1 | 6/2003 | Volpano | |
| 2003/0123449 A1 | 7/2003 | Kuhl et al. | |
| 2003/0147393 A1 | 8/2003 | Stewart | |
| 2003/0152075 A1 | 8/2003 | Hawthorne et al. | |
| 2003/0152182 A1* | 8/2003 | Pai et al. | 375/372 |
| 2003/0154315 A1 | 8/2003 | Sultan et al. | |
| 2003/0165146 A1 | 9/2003 | Sultan et al. | |
| 2004/0032856 A1 | 2/2004 | Sandstrom | |
| 2005/0259571 A1* | 11/2005 | Battou | 370/217 |
| 2006/0034292 A1* | 2/2006 | Wakayama et al. | 370/395.5 |
| 2011/0206057 A1 | 8/2011 | Rekhter | |

FOREIGN PATENT DOCUMENTS

| | | |
|---|---|---|
| EP | 0908954 | 4/1999 |
| EP | 1024642 A2 | 8/2000 |
| WO | WO9508190 | 3/1995 |
| WO | WO0070622 | 11/2000 |
| WO | WO02093830 | 11/2002 |

OTHER PUBLICATIONS

Kazuo Nakazato, et al., "PLED—Planar Localised Electron Devices," 1997, IEEE.

MMC Networks, "EPIF 4-L3 Reference Manual," MMC 97-0030, Issue 1.0, pp. i-viii, 1-1 to 1-6, 2-1 to 2-16, and 3-1 to 3-16, Oct. 1998.

MMC Networks, "AnyFlow 5400 Product Overview", 3 pages, 1998.

MMC Networks, EPIF4-L3C1 Ethernet Port L3 Processor, MMC Networks, Inc., MMC 98-0066, Issue 1.0, pp. 1-37, 1998.

MMC Networks, XPIF-300A3/XPIF-300A3-50 Gigabit BitStream Processor, MMC 99-0046, Issue 0.91, pp. 1-64, 1999.

* cited by examiner

SYSTEM AND METHOD FOR PROVIDING TRANSPARENT LAN SERVICES

CROSS-REFERENCE TO RELATED APPLICATION

This patent application claims priority, under 35 U.S.C. 120, as continuation patent application, to commonly assigned U.S. patent application Ser. No. 10/140,308, filed on May 6, 2002, entitled "LOGICAL PORT SYSTEM AND METHOD", which, in turn, is related to U.S. patent application Ser. No. 10/140,234, filed on May 6, 2002, entitled "SYSTEM AND METHOD FOR PROVIDING TRANSPARENT LAN SERVICES", the contents of each being hereby incorporated by reference in their entirety.

TECHNICAL FIELD

This invention relates to communication networks, and in particular to a system and method for providing transparent LAN (Local Area Network) services.

BACKGROUND OF THE INVENTION

Many network users, such as companies, have multiple sites within a metro area or region and desire to provide "internal" or LAN-like network connectivity between those locations, each of which may comprise an intranet. In addition, some of these network users desire network connections that are still somewhat private with suppliers and customers, or an extranet network connection.

Conventionally, network users have relied on point-to-point private line circuits and shared WAN (wide area network) technologies, such as frame relay and ATM (Asynchronous Transfer Mode) technologies.

In some applications, use of the foregoing approaches is limited in providing network users an efficient, scalable solution. For example, network users using point-to-point private line circuits typically require a separate point-to-point private line circuit for each pair of locations, or sites. Consequently, a network user having four locations requires six point-to-point private line circuits and a network user having six locations requires fifteen point-to-point private line circuits. Thus, the point-to-point private line circuit solution is not easily scalable and for large numbers of locations even larger numbers of point-to-point private line circuits are necessary. Indeed, for large numbers of locations, a point-to-point private line circuit solution can be expensive due to the cost of establishing and maintaining the various point-to-point private line circuits.

In addition, the point-to-point private line circuit solution is not bandwidth efficient. That is, unused bandwidth on some of the point-to-point private line circuits is not typically available for routing network traffic traversing other of the point-to-point private line circuits. The point-to-point private line circuit solution is further inefficient since data packets sent to all locations must be set over each of the multiple point-to-point private line circuits.

Accordingly, a need exists for a system and method for providing LAN-type network connectivity between multiple locations of a network user that is bandwidth efficient and highly scalable. An additional need exists to provide such a system and method that is easily provisioned and managed.

This invention relates to communication networks, and in particular to a system and method for providing transparent LAN (Local Area Network) services.

SUMMARY

In one embodiment, data packets are broadcast over a ring only to members of a particular domain using multicast MPLS protocol so that the data packets are forwarded to members of the particular domain only and not to other domains that are also connected to the same ring.

Pursuant to another aspect of the present invention, bandwidth efficiency is achieved by using native layer two broadcast of multicast MPLS data packet over a fiber optic ring having a Resilient Packet Ring (RPR) topology. Hence, a separate packet need not be sent to each of the nodes. Rather, a single multicast MPLS data packet is sent over the ring. By sending one, rather than several, MPLS data packet over the ring, bandwidth efficiency is achieved.

Another aspect of the present invention provides the ability to specify SLA (Service Level Agreement) guarantees, or QoS (Quality of Service) for each domain. For example, the nodes may limit the maximum amount of bandwidth each member of a domain may send or receive, the maximum amount of bandwidth the domain may use, and the type and quality of service provided to the members of the domain.

Further, a management console may be used to remotely provision, manage, and monitor network usage. In one embodiment, a user at the management console may configure a node via a graphical user interface to perform network provisioning.

Yet another aspect of the present invention provides a service header in the multicast MPLS data packet for communication of service level parameters. The service header may include the unicast label, a version field, and the IP address of the source. Thus, upon receipt of a data packet having a service header, the nodes receiving this unicast label store the unicast label and the IP address of the source. Hence, when the node needs to send a data packet to that source as a destination, the node may unicast the data packet to the appropriate node using the unicast label rather than sending the data packet to all nodes.

In operation, in accordance with one embodiment, a transmitting device belonging to a domain and connected to one of the nodes sends a data packet destined for another member of the domain over the ring. The data packet sent by the transmitting device includes a destination MAC address, a source MAC address, and a payload. The node to which the transmitting device is connected receives the data packet sent by the transmitting device and appends a unicast MPLS label, a multicast MPLS label, and a ring header to form a ring packet. The node then transmits the ring packet over the ring.

Each of the nodes on the ring receives the ring packet and inspects the multicast MPLS label to determine whether any members of the domain associated with the multicast MPLS label are connected to physical ports of the receiving node. If no members of the domain associated with the multicast MPLS label are connected to physical ports of a given node, that node passes the packet to other nodes on the ring without sending a copy of the packet on any of the customer ports of the node. Otherwise, the node strips off the ring header, the multicast MPLS label, and the unicast label and forwards the packet, as transmitted by the transmitting device, to the destination device.

The node also maintains an association table that associates the unicast label, or source label, and the source IP address with the source MAC address of the transmitting device. Thus, for future data transmissions to a device having that source MAC address, the node may unicast the data packet by appending the known unicast MPLS label associated with the device having that source address and a ring header, rather than multicasting the data packet, thereby furthering bandwidth efficiency.

Additional details regarding the present system and method may be understood by reference to the following detailed description when read in conjunction with the accompanying drawings.

BRIEF DESCRIPTION OF DRAWINGS

Common reference numerals are used throughout the drawings and detailed description to indicate like elements.

DETAILED DESCRIPTION OF PREFERRED EMBODIMENTS

Figure 1:
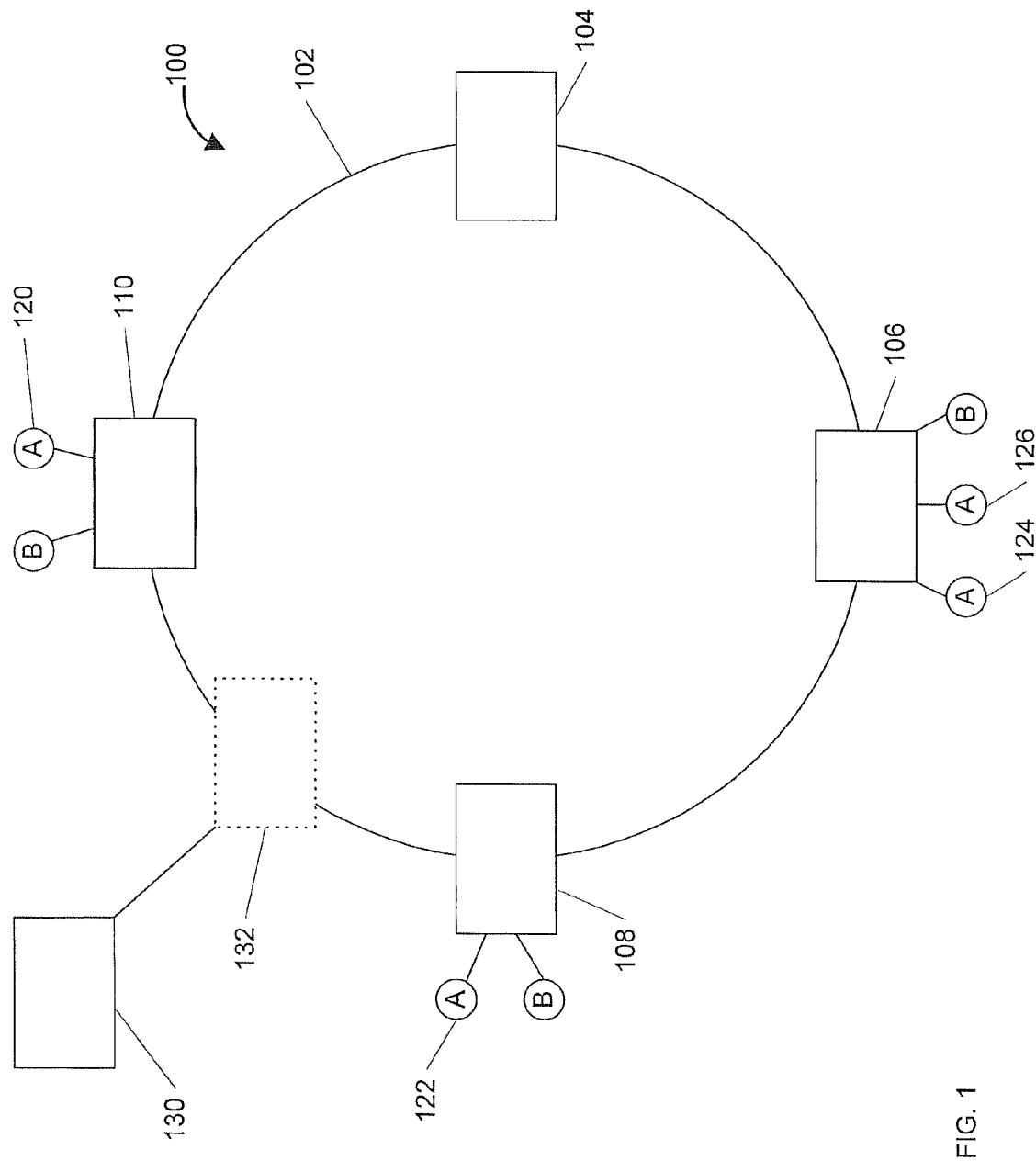
FIG. 1 illustrates multiple transparent LAN services domains in a single ring in accordance with one embodiment of the present invention.

FIG. 1 illustrates a network 100 in accordance with one embodiment of the present invention. As shown, the network 100 includes a ring 102, which interconnects nodes 104, 106, 108, 110. In one embodiment, the ring 102 may comprise a fiber optic ring having a Resilient Packet Ring (RPR) topology. In some applications, the network 100 may comprise a metro area network (MAN). Each of the nodes 104110 may comprise a high speed routing/multiplexing device. Details of the nodes are described below and in U.S. patent application Ser. No. 09/518,956, the disclosure of which is hereby incorporated by reference in its entirety.

Multiple transparent LAN services (TLS) domains, such as domains A and B may co-exist on the ring 102. A TLS domain may be identified by a port of a slot of a node. As discussed below, each TLS domain has an associated multicast MPLS label; each site within a TLS domain has a unique site ID. Thus, the multicast label may be used to send data to the various ports of the various nodes belonging to the domain associated with the multicast label.

In one embodiment, domain A may represent one network customer and domain B may represent another network customer where each of the customers has multiple locations, or sites. As illustrated, the network customer of domain A has multiple locations 120, 122, 124, and 126. Each of these locations may comprise a LAN. The location 120 is connected to node 110, the location 122 is connected to node 108, and locations 124, 126 are connected to node 106. In this configuration, the locations 120 and 122 may thus exchange data with each other over the ring 102 rather than over a point-to-point private line circuit. Further, the locations 124, 126 may also exchange data with locations 120 and 122 over the ring 102.

Each of the nodes 104-110 may include physical ports, such as Ethernet and Gigabit Ethernet ports. These physical ports may be configured to be a part of any of the domains A, B of the ring 102. In some embodiments, a physical port may be configured to be a part of multiple domains by virtue of subports (e.g., logical ports). Pursuant to the configuration of FIG. I, the membership in the domains A and B does not extend beyond the ring 102.

Further, as shown, multiple locations, or sites, 124, 126 of a single domain, such as domain A, may be supported by a single node, such as the node 106. In addition, QoS (Quality of Service) may be supported for each of the domains A, B.

In the configuration of FIG. I, transparent LAN services may be provided for each of the domains A and B. Pursuant to one embodiment, an endpoint device, such as a personal computer, of domain A may send a data packet to another endpoint device of domain A using multicast MPLS (Multi Protocol Label Switching) protocol. Because each multicast MPLS label is associated with one and only one of the domains, the data packet is multicast to members of domain A only and not to any members of the domain B. Likewise, a device of domain B may send a data packet to other devices of domain B using multicast MPLS protocol to broadcast the data packet to members of domain B only and not to any members of domain A. Nodes receiving the multicast MPLS data packet pass the packet on the ring without sending a copy of the packet to any of its customer ports if no member of the source domain is connected to the receiving node. If a node receiving the multicast MPLS data packet has a member of the source domain connected thereto, then the receiving node strips off a multicast MPLS label from the data packet and forwards the packet to the member of the domain connected thereto.

A transmitted data packet from one of the nodes 104110, may also include a service header. The service header is generally used to communicate service level parameters or path negotiation. Details regarding the service header are described below with reference to FIGS. 5 and 6.

A management console 130 may also be connected to the ring 102 by a node 132. The management console 130 is used to permit network management and provisioning of the devices connected to the ring 102 as described in more detail below.

Figure 2:
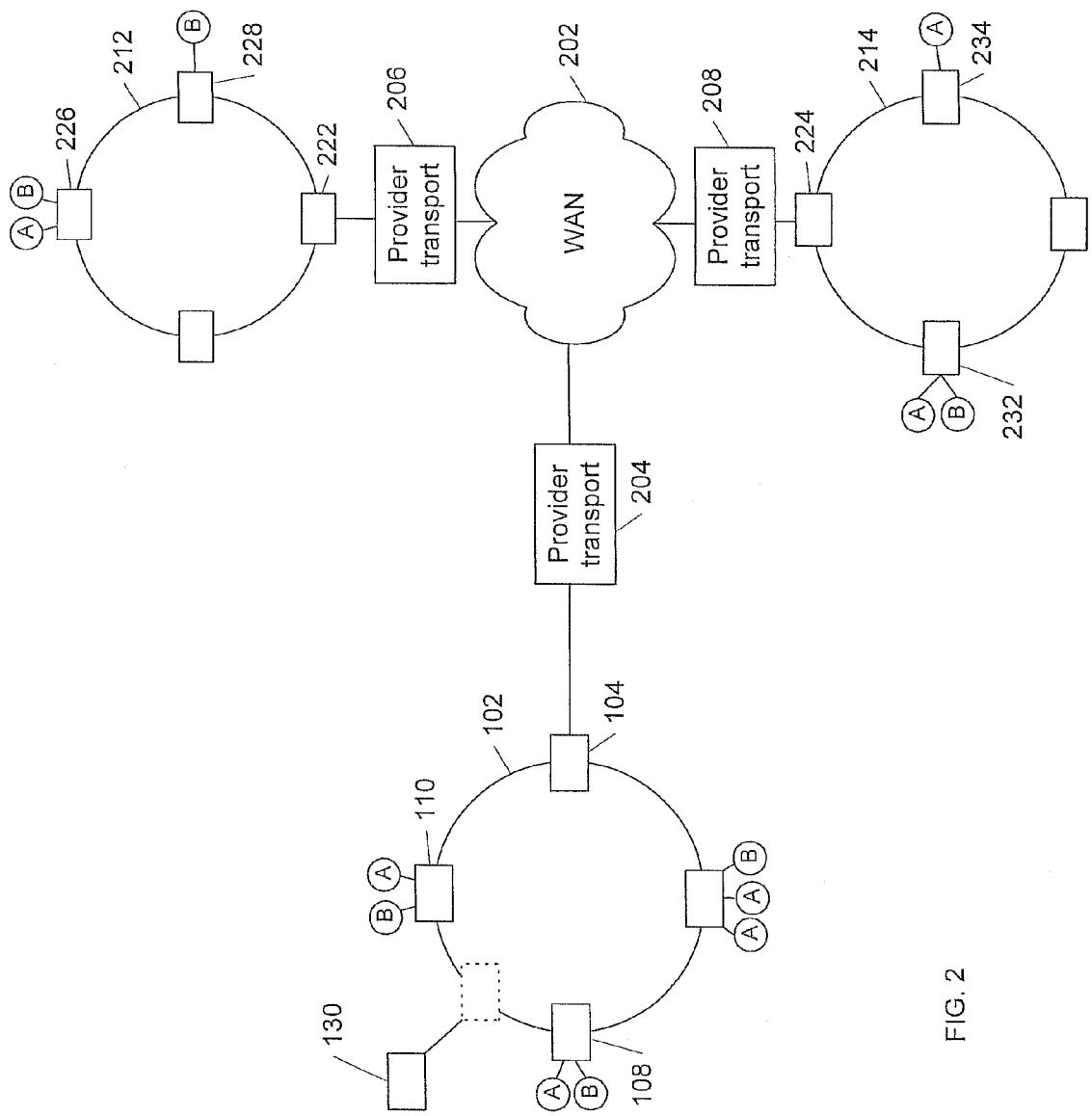
FIG. 2 illustrates multiple transparent LAN services domains in multiple rings in accordance with one embodiment of the present invention.

FIG. 2 illustrates a network 200 in accordance with another embodiment of the present invention. As shown, the network 200 includes the network 100 connected to a wide area network (WAN) 202 by the node 104 and provider transport 204. Provider transport 206 connects a ring 212 to the WAN 202 via a node 222. Likewise, provider transport 208 connects a ring 214 to the WAN 202 via a node 224. Each provider transport 204, 206, 208 may comprise an internet gateway.

Members of domains A and B are connected to the rings 212 and 214. As shown, a member of domain A and a member of domain B are connected to ring 212 via node 226. Similarly, a member of domain B is connected to the ring 212 via node 228. Further, a member of domain A and a member of domain B are connected to the ring 214 via node 232. A member of domain A is connected to the ring 214 via node 234. Accordingly, as shown in FIG. 2, domain A and domain B may span multiple rings 102, 212, 214. Moreover, a transparent LAN services domain, such as the domains A and B, may be within a single ring, across multiple rings, or between rings intervened by a WAN cloud.

Figure 3:
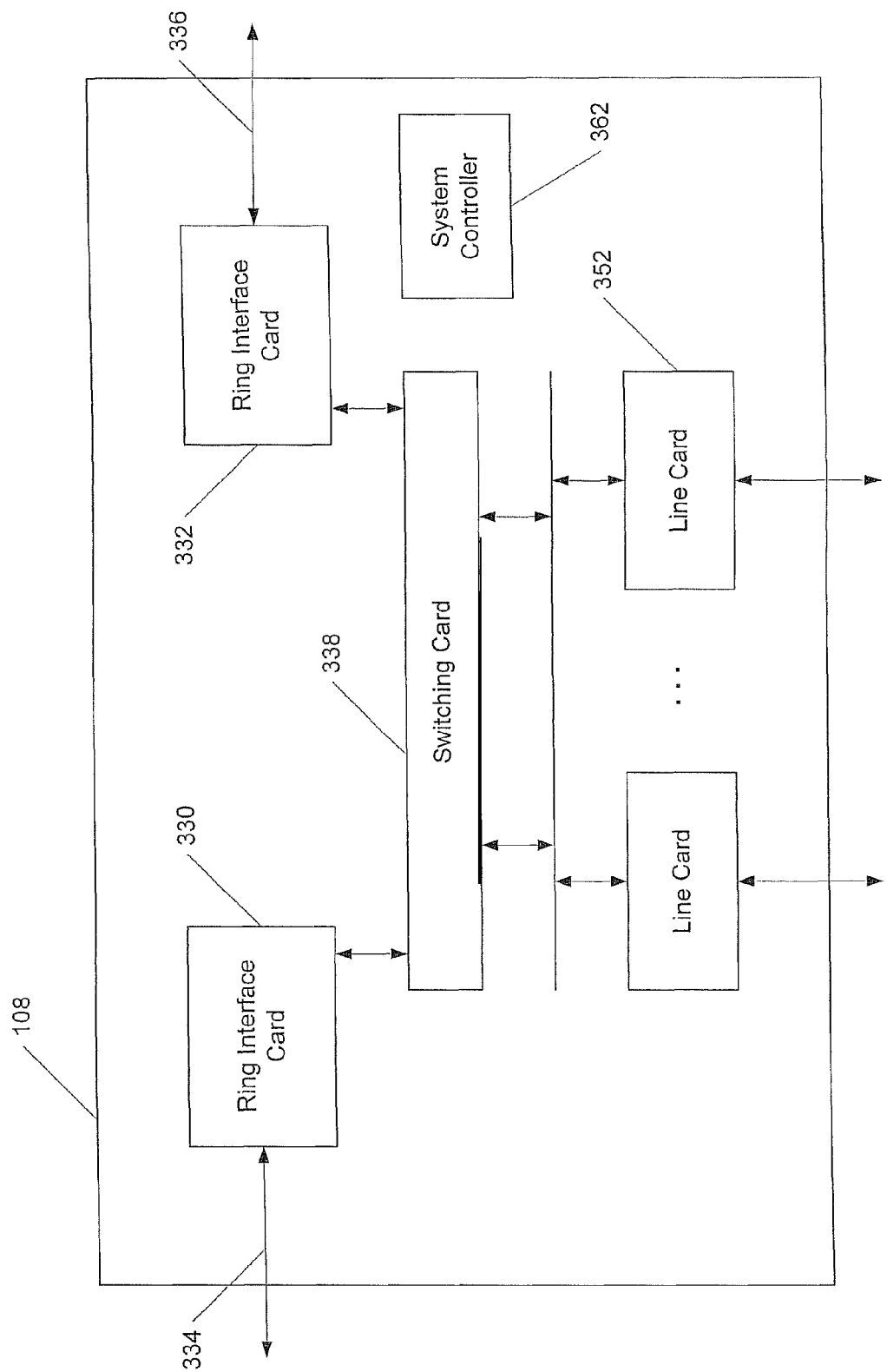
FIG. 3 illustrates pertinent functional units in a node of a FIG. 1 or FIG. 2 network in accordance with one embodiment of the present invention.

FIG. 3 illustrates details of one of the nodes of FIGS. 1 and 2, which may be similarly configured. Node 108 is shown as an example. As illustrated, the node 108 includes ring interface cards 330 and 332, a switching card 338, line cards 352, and a system controller 362. The ring interface cards 330 and 332 convert the incoming optical signals on fiber optic cables 334 and 336 to electrical digital signals for application to switching card 338. In one embodiment, the ring interface cards 330, 332 may be implemented as a singe card. Additional details regarding the ring interface cards 330 and 332 are disclosed in U.S. patent application Ser. No. 09/519,442, entitled "Dynamically Allocated Ring Protection and Restoration Technique" filed Mar. 3, 2000, the disclosure of which is hereby incorporated by reference in its entirety.

Figure 4:
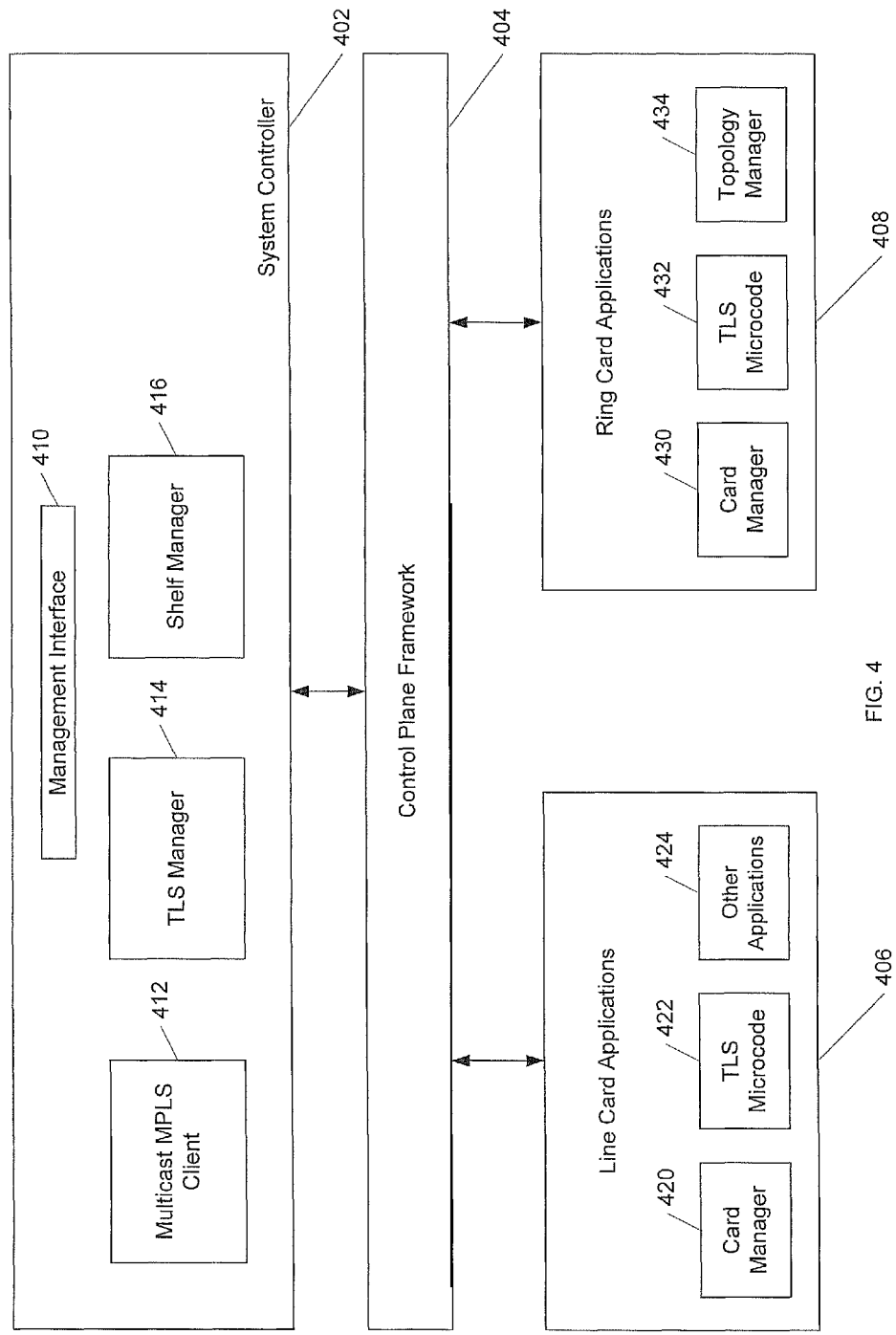
FIG. 4 illustrates a functional diagram of the node of FIG. 3 in accordance with one embodiment of the present invention.

FIG. 4 illustrates a functional diagram of the node 108 (FIG. 3) in accordance with one embodiment of the present invention. As illustrated, the functional diagram includes system controller applications 402, a control plane framework 404, line card applications 406, and ring card applications 408.

The system controller applications 402 include a management interface 410, a multicast MPLS client 412, a TLS manager 414 and a shelf manager 416. The system controller applications 402 may be performed by the system controller 362 (FIG. 3).

The management interface 410 performs interface functions between the node 108 (FIG. 3) and the management console 130 (FIG. 1). In one embodiment, the management interface 410 presents a user at the management console 130 with a graphical user interface to facilitate configuration, monitoring, management, and provisioning of the node 108 remotely from the management console 130. The management interface 410 thus permits point-to-click provisioning and monitoring of the node 108.

The TLS manager 414 fronts other interfaces and provides logical control for TLS functionality, remembers the TLS configuration of the node 108, and restores TLS configuration information after reboots.

Thus, the TLS manager 414 controls node-level information regarding TLS-related configurations on the node information regarding TLS-related configurations on the node 108, and interface to the multicast MPLS client 412, other of the system controller applications 402, and the line card applications 406. In particular, the TLS manager 414 deals with domains and interfaces that are members of those domains.

The TLS manager 414 also enforces logical rules to validate TLS-related requests. In one embodiment, the rules include the following. An interface may only join a TLS domain if the TLS domain is created first. A TLS domain may not be deleted if the TLS domain has members. TLS domain creation and member joining both query the multicast MPLS client 412 to verify, or determine, the multicast label for the domain. The TLS manager 414 also communicates with the multicast MPLS client 412 to get the TLS identifier label binding.

The shelf manager 416 implements TLS mode and provides triggers to the TLS manager 414 for card-level and port-level events.

The line card applications 406 include a card manager 420, TLS microcode 422, and other applications 424. The card manager 420 manages the operation of the line card 352 (FIG. 3).

Figure 7A:
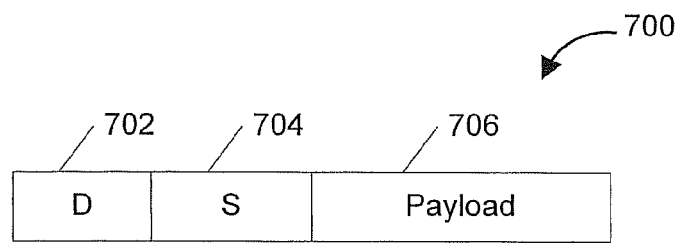
FIGS. 7A, 7B, and 7C illustrate data packet details in accordance with one embodiment of the present invention.

The TLS microcode 422 performs TLS-related line card functions. At the ingress of the line card 352 (FIG. 3) the TLS microcode 422 looks up the source MAC address of the incoming packet in an association table (not shown). The format of an example incoming packet 700 is illustrated in FIG. 7A and includes a destination MAC address 702, a source MAC address 704, and a payload 706. The incoming packet 700 may also include cyclic redundancy code, an Ethernet type field of the payload, or both (not shown).

If the source MAC address 704 of the incoming packet 700 is not found in the association table, the TLS microcode 422 adds the source MAC address 704 of the incoming packet to the association table.

Figure 7B:
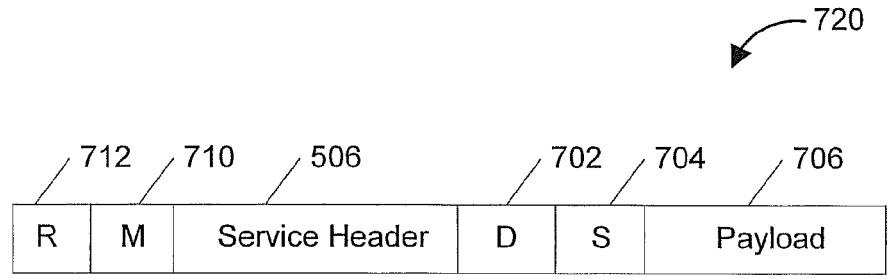

The TLS microcode 422 also looks up the destination MAC address 702 of the incoming packet 700 in the association table. If the destination MAC address 702 of the incoming packet 700 is not found in the association table, the TLS microcode 422 appends to the incoming packet the broadcast MAC address and the multicast MPLS label of the associated TLS domain. In one embodiment/the TLS microcode 422 appends the service header 506, a multicast MPLS label 710, and a ring header 712 to the incoming packet 700 (See/FIG. 7B) to form a ring packet 720. The line card 352 (FIG. 3) then forwards the ring packet 720 to the switching card 338 for transmission over the associated ring to all members of the associated TLS domain.

In one embodiment, an MPLS unicast label 702 is allocated for a logical port at the time the logical port joins a domain. The unicast label 702 is appended to every incoming data packet on the logical port, going out on the ring. The other nodes on the ring, and on connected rings, learn from the transmitted data packets including the unicast label 702 and use this label to send packet to MAC addresses at the associated logical port. The ring card is provisioned with the forwarding entry to direct all incoming packets with this label to the corresponding logical port.

Figure 7C:
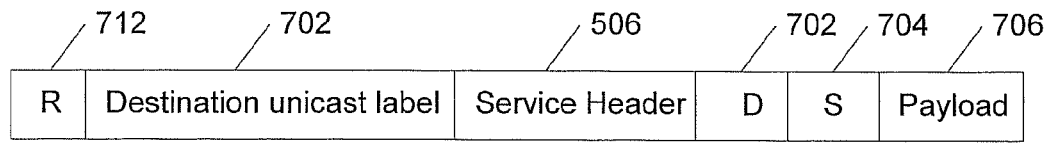

If the destination MAC address 702 of the incoming packet 700 is found in the association table, the TLS microcode 422 retrieves the corresponding destination unicast label 702 from the association table. The TLS microcode 422~hen appends the service header 506, the destination unicast label 702, and the ring header 712 to the incoming packet 700 to form the ring packet 730 of FIG. 7C. The TLS microcode 422 appends the service header so that the destination node can learn the parameters contained therein upon receipt of the service header. The node 108 (FIG. 3) then transmits the ring packet 730 according to the unicast label 702 to the specific node associated with the destination MAC address 702.

Hence, a user at the management console 130 may remotely request a TLS domain for a particular line card of a specific node over the ring. The TLS domain request may be to add a new domain or to add a member to an existing domain. The request may also specify SLA guarantees, rate limits, quality of service, and the like associated with the domain. In response, the associated MPLS client sets up, or establishes a MPLS multicast tunnel and an associated MPLS multicast label for that tunnel.

Referring again to FIG. 4, the ring card applications 408 may be performed by the ring interface cards 330, 332, the switching card 338 (FIG. 3), or both. The ring interface cards 330, 332 receive ingress packets from the ring 102 (FIG. 1). Upon receipt of a ring packet, such as one of the ring packets 720, 730 (FIGS. 7B and 7C), the TLS microcode 432 determines whether the ring packet is a multicast or a unicast ring packet by determining whether the ring packet includes a multicast MPLS label associated with a domain, such as one of the domains A, B (FIGS. 1, 2) If the ring packet does not include a multicast MPLS label, the microcode 432 passes the packet to the associated line card 352 (FIG. 3) according to the unicast label 708.

If the ring packet 720, 730 includes a multicast MPLS label, the TLS microcode 432 determines whether a member of the domain associated with the multicast MPLS label is connected to the node 108. If a member of the domain associated with the multicast MPLS label is connected to the node 108 then the TLS microcode 432 strips the ring header and any multicast and unicast labels and passes the data packet to the line card 352 associated with the member of the domain. If a member of the domain associated with the multicast MPLS label is not connected to the node 108, the TLS microcode 432 causes the packet to be forwarded on the ring without sending a copy of the packet to any of its customer ports.

Figure 5:
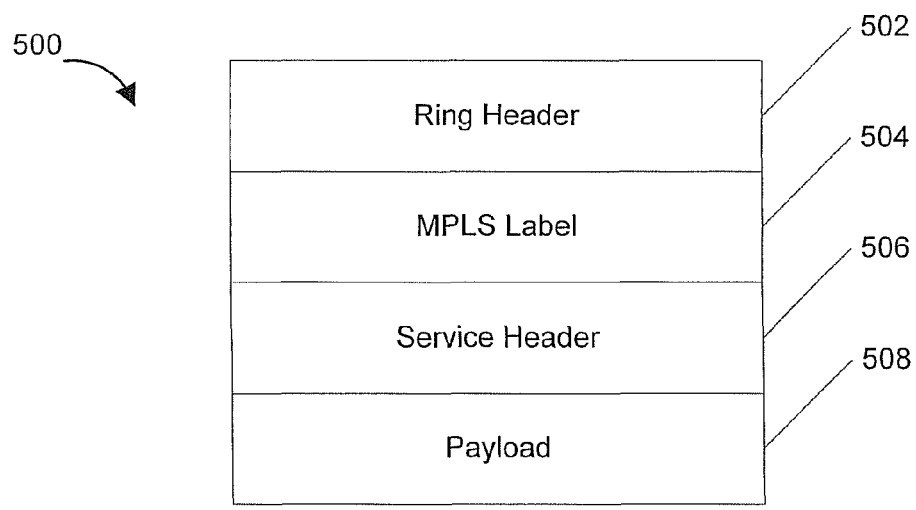
FIG. 5 illustrates a data packet in accordance with one embodiment of the present invention.

FIG. 5 illustrates an embodiment of a ring packet 500 including a ring header 502, an MPLS label 504, a service header 506, and a payload 508. The service header 506 is used for two end points to communicate any service level parameters or path negotiation. The service header 506 may, in some applications, be considered as a part of the payload 508.

Figure 6:
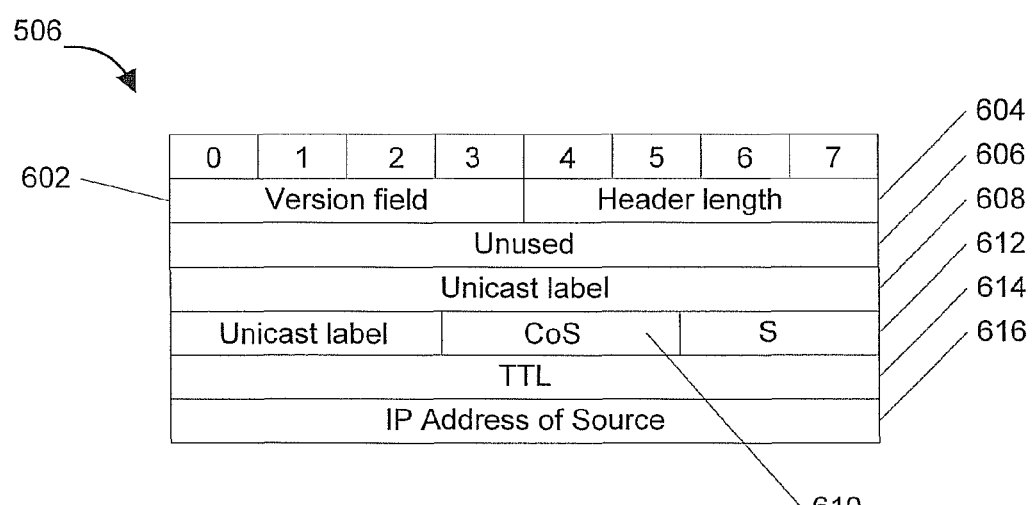
FIG. 6 illustrates details of the service header of the FIG. 5 data packet in accordance with one embodiment of the present invention.

FIG. 6 illustrates details of an embodiment of the service header 506 of FIG. 5. As shown, the service header 506 includes a version field 602, a header length field 604, unused field 606, a unicast label field 608, a CoS (Class of Service) field 610, a stack bit field 612, a TTL (Time To Live) field 614, and an IP address of source field 616. The version field 602 may be four bits long and indicates the version of the service. The header length field 604 may be four bits long and indicates the length of the service header in multiples of 16 bits. Hence, a value of three in the header length field indicates a service header length of six bytes or 48 bits long.

The unicast label field 608 is used by the TLS service layer to indicate the source MPLS label to use for return path for the source MAC address in the payload. This field may be set to be 20 bits long and may contain a static MPLS label.

The CoS field 610 contains the CoS to be used in the return path. This is ignored by the TLS service endpoint and instead the provisioned CoS for the TLS port is used while sending packets. The CoS field 610 may be 3 bits long. The stack bit 612 may be 1 bit long. The TTL field may be 8 bits long and may be replaced with a hash ID of a ring card of the source node.

Accordingly, the present system and method provide an efficient mechanism for providing transparent LAN services by performing multicast MPLS over a ring network and the provision of a service header to communicate service level parameters.

The above-described embodiments of the present invention are meant to be merely illustrative and not limiting. Thus, those skilled in the art will appreciate that various changes and modifications may be made without departing from this invention in its broader aspects. Therefore, the appended claims encompass all such changes and modifications as fall within the scope of this invention.

What is claimed is:

1. A method for providing transparent LAN services over a ring network, the ring network including a plurality of nodes and domains, the method comprising:
   receiving a first data packet at one of the plurality of nodes on the ring network, wherein a source device of a domain transmits the first data packet, further wherein the first data packet includes a destination MAC address and a MAC address of the source device;
   appending a ring header, a service header, and a multicast MPLS label to the first data packet to form a ring packet, wherein the service header includes a unicast MPLS label and a source IP address, further wherein the multicast MPLS label is associated with the domain only;
   maintaining a table that associates both the unicast MPLS label and the source IP address of the service header of the ring packet with the MAC address of the source device; and
   transmitting the ring packet onto the ring network to be multicast to at least another device of the domain associated with the multicast MPLS label.

2. The method of claim 1, wherein the ring network further comprises a fiber optic ring having a resilient packet ring topology.

3. The method of claim 1, wherein the service header further includes version, header length, stack bit, time to live, and class of service information.

4. The method of claim 1, further comprising:
   utilizing a management console for permitting network usage monitoring, network management and provisioning of devices connected to the ring network.

5. A method for providing transparent LAN services over a ring network, the ring network including a plurality of nodes and domains, the method comprising:
   maintaining a table that associates both a unicast MPLS label and a source IP address of a service header of at least one ring packet with a MAC address of at least one source device;
   receiving a ring packet at a second node on the ring network, wherein a first node on the ring network transmits the ring packet to the second node, wherein the ring packet includes a ring header, a service header, and a multicast MPLS label, wherein the multicast MPLS label is associated with a one domain only;
   determining whether any devices of the one domain associated with the multicast MPLS label are connected to physical ports of the second node;
   wherein if at least one device of the one domain associated with the multicast MPLS label is not connected to the physical ports of the second node, transmitting the ring packet to at least a third node on the ring network;
   wherein if at least one device of the one domain associated with the multicast MPLS label is connected to the physical ports of the second node, stripping off the ring header, the service header, and the multicast MPLS label and transmitting a stripped data packet to at least another device of the one domain associated with the multicast MPLS label.

6. The method of claim 5, wherein the ring network further comprises a fiber optic ring having a resilient packet ring topology.

7. The method of claim 5, further comprising:
   utilizing a management console for permitting network usage monitoring, network management and provisioning of devices connected to the ring network.

8. The method of claim 5, wherein the service header further includes version, header length, stack bit, time to live, and class of service information.

9. The method of claim 1, further comprising:
   receiving a second data packet at one of the plurality of nodes on the ring network; and
   determining whether the destination MAC address of the second data packet is located in the table;
   wherein if the destination MAC address of the second data packet is located in the table, appending a unicast MPLS label associated with the destination MAC address to the second data packet and transmitting the second data packet directly to a specific node associated with the destination MAC address;
   wherein if the destination MAC address of the second data packet is not located in the table, appending a ring header, a service header, and a multicast MPLS label to the data packet to form a ring packet and transmitting the ring packet onto the ring network to be multicast to at least another device of the domain associated with the multicast MPLS label.

* * * * *